Oct. 4, 1938.    J. A. GABRIEL    2,132,262
THERMOOPERATIVE VALVE
Filed Feb. 5, 1937
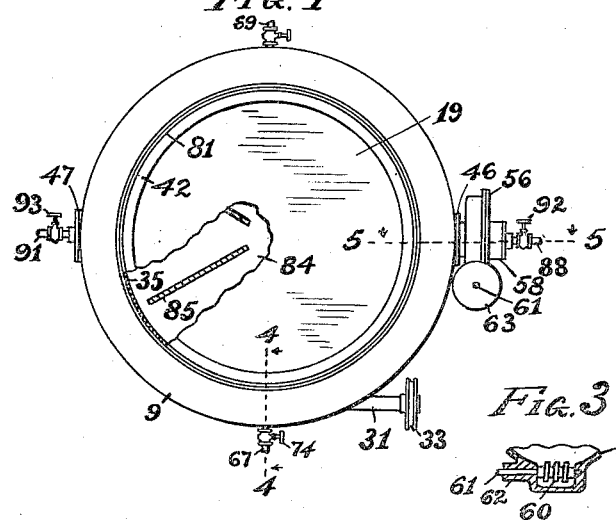
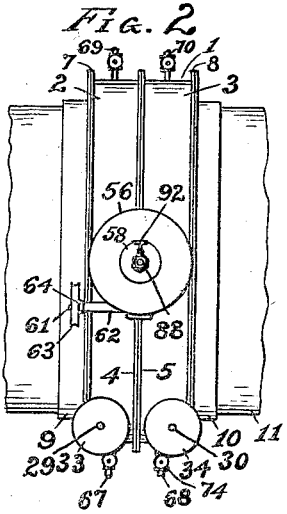
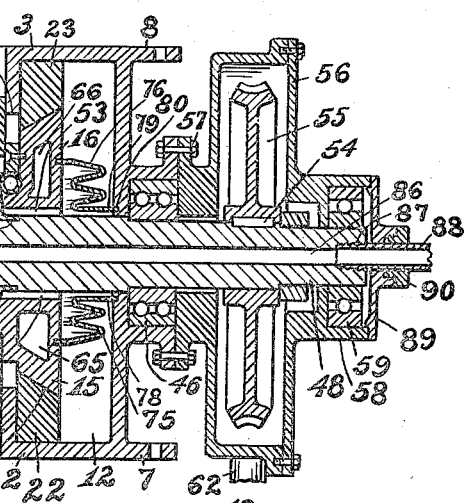
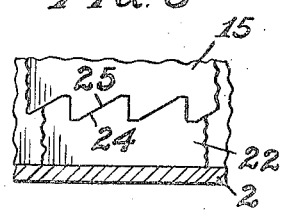
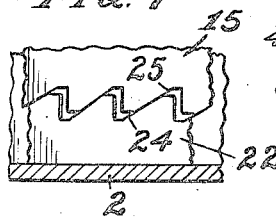
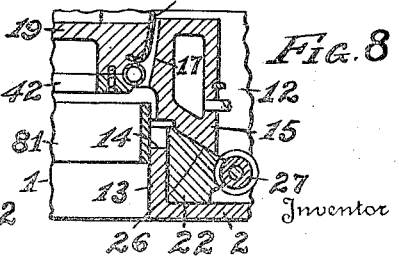
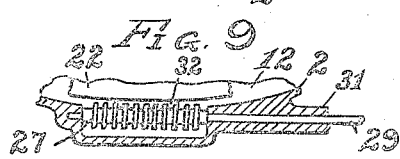
Inventor
J. A. Gabriel
By [signature]
his Attorney Patented Oct. 4, 1938

2,132,262

UNITED STATES PATENT OFFICE 2,132,262

THERMOOPERATIVE VALVE

Joseph A. Gabriel, Rocky River, Ohio

Application February 5, 1937, Serial No. 124,215

24 Claims. (Cl. 251—11)

This invention relates to valves, and more especially to butterfly valves of the larger sizes for hot gases or fluids under pressure.

The main object of the invention is to provide a butterfly valve in which the seat is normally sealed against leakage by contraction thereof when the valve is closed and heat is applied to the seat for expanding same to permit opening of the valve.

Another object of the invention is to provide a valve of the above character, in which the butterfly may be contracted by cooling same to permit movement of the butterfly to its open position.

A further object of the invention is to provide a valve which is normally sealed against leakage when closed, and in which the butterfly may be cooled for contracting same relative to its seat and the seat heated for expanding same relative to the butterfly, whereby said contraction and expansion will permit free opening and closing movement of the butterfly.

A still further object of the invention is to provide a valve of the above character, in which the butterfly may be sealed by pressure therein.

And another object of the invention is to provide a valve of the above character, in which the seat may be manually forced into sealing engagement with the butterfly or moved out of engagement therewith.

With the above and other objects in view, the invention will be hereinafter fully described with reference to the accompanying drawing, and the novel features thereof will be particularly pointed out in the appended claims.

In the drawing, Figure 1 is an end elevation of a valve constructed in accordance with my invention, Fig. 2 is a side elevation of same, Fig. 3 is a view of the worm for operating the butterfly, Fig. 4 is a cross-sectional view, on an enlarged scale, taken on line 4—4 of Fig. 1, Fig. 5 is a similar view taken on line 5—5 of Fig. 1, Fig. 6 is a view looking radially from inside of valve, illustrating the teeth of cam-ring in complete engagement with the teeth of shrink-ring, or before cam-ring has moved forwardly.

Fig. 7 is a similar view, the cam-ring having moved forwardly and teeth thereof not in complete engagement with teeth of shrink-ring, Fig. 8 is a similar view to Fig. 4, illustrating the shrink-ring in its expanded position relative to the butterfly, and Fig. 9 illustrates the worm for actuating the cam-ring.

Referring to the drawing, the valve consists of a cylindrical casing 1 formed of two similar and complemental sections 2 and 3 having inner end flanges 4 and 5 adapted to be bolted together at 6. Said sections of the casing are also provided with outer end flanges 7 and 8, to which are to be bolted, the end flanges 9 and 10 of a conduit 11 for gas or fluid in which the valve is installed for controlling the flow therethrough. Central of the casing 1 is a circumferential chamber 12 of rectangular cross section, the inner side 13 of which is cut out at 14 to provide a circumferential opening leading into said chamber.

Arranged in the chamber 12 and extending through the opening 14 are a pair of shrink-rings 15 and 16, which together form a seat indicated by 17 for the spherical face 18 of a butterfly 19. The shrink-rings 15 and 16 are separated by a central space 20 and a radially corrugated spring 21 arranged in said space tends to force said shrink-rings away from each other. For the purpose of manually actuating the shrink-rings 15 and 16 towards each other and thereby forcing their seats into central position for engagement therewith of the face 18 of the butterfly 19 when closing, and also in the opposite direction, a pair of cam-rings 22 and 23 are provided. The cam-rings 22 and 23 have forwardly inclined teeth 24 adapted to slidably engage corresponding faces 25 of said shrink-rings 15 and 16, and said teeth are radially inclined at 26 for engaging corresponding faces of said shrink-rings. Rotary movement is imparted to each of the cam-rings 22 and 23 by means of worms 27 and 28 fixed to shafts 29 and 30, which are rotatably supported in laterally extending bearings of the casing as indicated by 31. The worms 27 and 28 engage transverse teeth at 32 depending from the lower side of the periphery of the cam-rings 22 and 23. Fixed to the projecting ends of the shafts 29 and 30 are chain wheels 33 and 34, which may be rotated by pull-chains or in any suitable manner.

The seat 17 of the shrink-rings 15 and 16 is spherical and adapted to engage the corresponding spherical face 18 of the butterfly 19. To prevent corrosion and consequent sticking of the face 18 of the butterfly to the seat 17 of the shrink-rings, a cover band of stainless steel 35 is fixed over said face by crimping the edges 36 and 37 thereof to the butterfly. For keeping the seat 17 and the face 18 clean from the opening and closing action of the butterfly 19, a ring of wound spring steel 38 is arranged in a groove 39 of the butterfly and a similar spring 40 in a groove 41 of the shrink-ring 16. The spring 38 is held in position by means of a retaining ring 42 which is fixed to the butterfly by screws indicated by 43, and the spring 40 is retained by a ring 44 fixed to the shrink-ring 16 by screws 45.

The butterfly 19 is rotatably supported in ball-bearings at 46 and 47 of the casing by a pair of transversely extending trunnions as 48, which are fixed by pressing into sockets as 49 of the butterfly and pinning same at 50. At the trunnions 48, the band 35 of the butterfly 19 is provided with collars indicated by 51 which are welded to the trunnions to prevent leakage. The shrink-rings 15 and 16 are cut out at 52 and 53 for the trunnions and also to provide a space to permit the before mentioned movement thereof. For the purpose of opening and closing the butterfly 19, one of the trunnions 48 is extended beyond its bearing 46, and keyed thereto at 54 is a worm-wheel 55. A suitable housing 56 for the chain wheel 55 is bolted at 57 to the casing 1, and its boss 58 carries a ball-bearing 59 for the outer end of the trunnion. The wheel 55 is manually and rotatably moved by means of a worm 60 fixed to a shaft 61 extending from a lateral bearing 62 of the housing 56 and having fixed to its outer end a chain-wheel 63. Packing at 64 prevents leakage around the shaft 61.

The shrink-rings 15 and 16 are adapted to contract radially under normal conditions in order that the seat 17 thereof will engage the face 18 of the butterfly 19 when closed to prevent leakage. When it is desired to open or close the butterfly, it is necessary to expand the shrink-rings 15 and 16 before the butterfly may be turned. This is accomplished by the following described means. The shrink-rings 15 and 16 are hollow as at 65 and 66, and steam is introduced therein by means of inlet pipes 67 and 68 and outlet pipes 69 and 70. Said pipes pass through and are fixed in the outer wall of the casing as at 71 and in the shrink-ringe as at 72. To allow for said contraction and expansion movement and manual movement of the shrink-rings 15 and 16 relative to the casing, said inlet and outlet pipes are flexible and looped as at 73. Shut-off valves indicated by 74 are arranged in the pipes 67, 68, 69 and 70. And for permitting said movements of the shrink-rings 15 and 16 relative to the casing and yet prevent leakage from one side to the other of the chamber 12, suitable diaphragms 75 and 76 of the bellows type and having their outer peripheral edges fixed as at 77 to the shrink-rings 15 and 16, and their inner edges 78 and 79 fixed between the central flanges 4 and 5 of the casing are provided. Around the trunnions 48, the inner edges 78 and 79 of the diaphragms 75 and 76 are fixed to the casing at 80. To prevent dust or dirt entering the circumferential spaces between the cut-out edges 14 of the casing and the shrink-rings 15 and 16, tubular cover-rings 81 and 82 are provided, and may be held in position by being fixed at 83 to the casing.

Besides the normal contraction of the shrink-rings 15 and 16 to cause a seal between the seat 17 thereof and the face band 35 of the butterfly 19, means are provided for forcing said face band and retaining same by pressure within the butterfly against said seat to further insure the seal. For this purpose, the butterfly 19 is made hollow and is open to its face band 35 as indicated at 84 and a plurality of radial spacer bars 85 are formed integrally with the sides thereof. The trunnion 48 is provided with a central opening 86 leading to the hollow center 84 of the butterfly and the outer end of said opening is tapped at 87 for receiving the end of an inlet pipe 88. Said inlet pipe passes through an end plate 89 fixed to the boss 58, and a packing nut 90 in said plate prevents leakage. An outlet pipe 91 is similarly connected to the end of the other trunnion as is the inlet pipe 88. A shut-off valve 92 is fixed in the inlet pipe 88, and a similar valve 93 to the outlet pipe 91. Pressure admitted to the hollow center 84 of the butterfly 19 forces the face band 35 against the seat 17, thereby assisting in making a tight seal. By closing the valves 92 and 93, the pressure is retained within the butterfly.

For causing diametrical contraction of the butterfly 19 to ease or break the seal between its face band 35 and the seat 17, cold water may be admitted to or through its hollow center 84.

In practice, the relative diameter of the butterfly 19 and the shrink-rings 15 and 16 are such that the seat 17 of the shrink-rings will normally engage the face band 35 of the butterfly to form a seal. In order to operate the butterfly 19 to its closed position, the cam-rings 22 and 23 are rotatably moved rearwardly by the worms 27 and 28 by means of the chain wheels 33 and 34 until the teeth 24 of said cam-rings register completely with the faces 25 of the shrink-rings 15 and 16, as in Fig. 6, to permit separating movement of said shrink-rings by the action of the spring 21. The shrink-rings 15 and 16 are then expanded diametrically by admitting steam to their hollow centers 65 and 66 through the inlet pipes 67 and 68, whereby the enlarged diameter of the seat 17 will permit the actuating of the butterfly 19 to closed position by means of the chain wheel 61. When the butterfly is in closed position, the cam-rings 22 and 23 are rotatably moved forwardly by turning the wheels 33 and 34, and the teeth 24 exert pressure on the faces 25 thereby forcing shrink-rings 15 and 16 into position for engagement with the band face 35. The stem to the shrink-rings is then shut off by means of the valves 74, which permits said shrink-rings to cool and thereby contract to normal diameter thus forming a seal between said shrink-rings and the butterfly. When the shrink-rings are cooling and contracting, the radial faces thereof being in engagement with the corresponding faces 26 of the cam-rings 22 and 23 causes said shrink-rings to be forced towards each other by the wedge action of said faces, thereby aiding in said sealing of the butterfly. To hasten the cooling of the shrink-rings 15 and 16, and thereby shorten the time for the contracting thereof, cold water may be passed through said shrink-rings.

For increasing the sealing pressure by forcing the face band 35 of the butterfly 19 against the seat 17 of the shrink-rings 15 and 16, pressure is admitted at 88 to the hollow center 84 of the butterfly and retained therein by closing the valves 92 and 93.

In order to operate the butterfly 19 from its closed and sealed position, the cam-rings 22 and 23 are rotatably moved rearwardly by the manual turning of the chain wheels 33 and 34 to move the teeth 24 into complete registration with the faces 25 of the shrink-rings 15 and 16. Next the pressure is released from the hollow center 84 of the butterfly. Steam is then admitted to the hollow centers of the shrink-rings 15 and 16 for expanding same. When the shrink-rings have expanded sufficiently to separate the seat 17 thereof from the face 18 of the butterfly, the butterfly may be rotated on its trunnions to open position.

By passing cold water through the butterfly, the butterfly will contract diametrically and this may be done at the same time that the shrink-rings are being expanded by steam, thereby saving time in the opening or closing operation of the valve.

From the above, it will be clear that this construction of valve provides for the sealing action by utilizing the force of contraction and expansion for the breaking of the seal to permit operation of the valve in the opening or closing of same. That the admitting of heating or cooling means to the shrink-rings or butterfly may be carried out at will by manipulation of the various inlet and outlet shut-off valves. That pressure may be admitted to and retained within the butterfly for providing additional sealing action. Also that the shrink-rings may be manually moved into contact with the sealing face of the butterfly. And that the seat of the shrink-rings and that the face of the butterfly will be kept clean by the wiping action of the coiled spring rings carried thereby due to the opening and closing movement of the butterfly.

Having fully described my invention, what I claim is:

1. In a valve, the combination of a casing, a member for controlling the flow through the casing, a seat for said member, the seat being floatably mounted in said casing, the seat being adapted to normally engage said member when in closed position, and means for expanding said seat to permit operation of said member relative thereto.

2. In a valve, the combination of a casing, a member operatively supported in the casing for controlling the flow therethrough, a seat, the seat being loosely mounted in said casing and adapted by contracting to engage said member when in closed position, and means for expanding said seat by heat to permit operation of said member relative thereto.

3. In a valve, the combination of a casing, a member operatively supported in the casing for controlling the flow therethrough, a seat, the seat being loosely mounted in said casing and adapted by contraction to normally engage said member when in closed position, the seat being hollow, and means for admitting heat to the inside of said seat for causing expansion thereof to permit operation of said member relative thereto.

4. In a valve, the combination of a casing, a member operatively mounted in the casing for controlling the flow therethrough, a seat for said member, the seat being loosely mounted in the casing, means for manually moving said seat for engagement thereof with said member, and means for expanding said seat to permit operation of said member relative thereto.

5. In a valve, the combination of a casing, a member operatively supported by the casing for controlling the flow therethrough, a seat, the seat being loosely mounted in the casing and adapted to engage said member, means for actuating said seat relative to said member, and means for preventing leakage through said casing from one side of said seat to the other when said seat is in engagement with said member.

6. In a valve, the combination of a casing, a member operatively supported by the casing for controlling the flow therethrough, a seat, the seat being loosely mounted in the casing and adapted to engage said member when in closed position, means for expanding said seat to permit operation of said member relative thereto, a diaphragm, and the diaphragm being connected to said seat and to said casing for preventing leakage through the casing from one side of said member to the other when said seat is in engagement with said member.

7. In a valve, the combination of a casing, a member operatively supported by the casing for controlling the flow therethrough, a seat, the seat being loosely mounted in said casing and adapted by contraction to engage said member when closed, said seat being hollow, an inlet pipe leading into the hollow portion of said seat for admitting steam thereto to expand same to permit operation of said member relative to said seat, and said inlet pipes being flexible between said casing and said seat to permit said movement of said seat.

8. In a valve, the combination of a casing, a member operatively supported in the casing for controlling the flow therethrough, a seat for said member, the seat being loosely mounted in said casing, the seat being adapted to normally engage said member by contraction when closed, means for exerting pressure between said member and its seat, and means for expanding said seat to permit operation of said member relative thereto.

9. In a valve, the combination of a casing, a member operatively supported in the casing for controlling the flow therethrough, a seat for said member, the seat being loosely mounted in said casing, the seat being adapted to normally engage said member when closed, said member being hollow and open to its seat, a flexible band enclosing said open portion of said member, means for admitting pressure within said member for forcing said band against said seat, and means for expanding said seat to permit operation of said member relative thereto.

10. In a valve, the combination of a casing, a member for controlling the flow through the casing, a seat for said member, the seat comprising two parts, said parts being loosely mounted in the casing, and adapted to engage said member when closed, means tending to force said parts of the seat apart, means for moving said parts towards each other, and means for expanding said parts to permit operation of said member relative thereto.

11. In a valve, the combination of a casing, a member for controlling the flow through the casing, a pair of shrink-rings adapted to form a seat for said member when closed, the shrink-rings being loosely mounted in the casing, means tending to force said shrink-rings apart, means for forcing said shrink-rings towards each other, and means for expanding said shrink-rings to permit operation of said member relative thereto.

12. In a valve, the combination of a casing, a member for controlling the flow through the casing, a pair of shrink-rings adapted to form a seat for said member when closed, the shrink-rings being loosely mounted in the casing, means arranged between said shrink-rings tending to force same apart, cam-rings for forcing said shrink-rings towards each other, means for actuating said cam-rings, and means for expanding said shrink-rings to permit operation of said member relative thereto.

13. In a valve, the combination of a casing, a member for controlling the flow therethrough, a pair of shrink-rings adapted to form a seat for said member when closed, the shrink-rings being loosely mounted in the casing, means tending to force said shrink-rings apart, cam-rings, the cam-rings having inclined teeth, the shrink-rings having inclined faces adapted to be engaged by said teeth, means for actuating said cam-rings for forcing said shrink-rings towards each other, and means for expanding said shrink-rings to permit operation of said member relative thereto.

14. In a valve, the combination of a casing, a member for controlling the flow therethrough, a pair of shrink-rings adapted to form a seat for said member when closed, the shrink-rings being loosely mounted in the casing, means tending to force said shrink-rings apart, cam-rings for forcing said shrink-rings towards each other, cover rings for preventing dirt entering between said shrink-rings and said cam-rings, and means for expanding said shrink-rings to permit operation of said member relative thereto.

15. In a valve, the combination of a casing, a member for controlling the flow therethrough, a pair of shrink-rings adapted to form a seat for said member when closed, the shring-rings being loosely mounted in the casing, means tending to force said shrink-rings apart, cam-rings for forcing said shrink-rings towards each other, means for preventing leakage through the casing from one side of said member to the other when said shrink-rings are in engagement with said member, and means for expanding said shrink-rings to permit operation of said member relative thereto.

16. In a valve, the combination of a casing, a member for controlling the flow therethrough, a pair of shrink-rings adapted to form a seat for said member when closed, the shrink-rings being loosely mounted in the casing, means tending to force said shrink-rings apart, cam-rings for forcing said shrink-rings towards each other, a diaphragm fixed to each shrink-ring and to the casing for preventing leakage through the casing from one side of said member to the other when in closed position, and means for expanding said shrink-rings to permit operation of said member relative thereto.

17. In a valve, the combination of a casing, a member for controlling the flow therethrough, a pair of shrink-rings adapted to form a seat for said member when closed, the shrink-rings being loosely mounted in the casing, means tending to force said shrink-rings apart, cam-rings for forcing said shrink-rings towards each other, the shrink-rings being hollow, inlet pipes leading into said shrink-rings, the inlet pipes being flexible to permit movement of said shrink-rings relative to said casing and said member, and means for admitting heat through said inlet pipes for expanding said shrink-rings to permit operation of said member relative to the shrink-rings.

18. In a valve, the combination of a cylindrical casing, the casing having a chamber, the casing having an opening leading into said chamber, a pair of shrink-rings loosely mounted in said opening and entering said chamber, a butterfly, the butterfly being rotatably supported in the casing, said shrink-rings being adapted to normally engage the butterfly when closed, and means for expanding said shrink-rings to permit operation of said butterfly relative thereto.

19. In a valve, the combination of a cylindrical casing, the casing having a chamber, the casing having an opening leading into said chamber, a pair of shrink-rings loosely mounted in said opening and extending into said chamber, a butterfly, the butterfly being rotatably supported in the casing, said shrink-rings being adapted to normally engage the butterfly when closed, cam-rings for forcing said shrink-rings laterally towards each other, means for actuating said cam-rings, and means for expanding said shrink-rings to permit operation of said member relative thereto.

20. In a valve, the combination of a cylindrical casing, the casing having a chamber, a pair of shrink-rings loosely mounted in said chamber, a butterfly rotatably supported in said casing, said shrink-rings being adapted to normally engage said butterfly when closed, means tending to force said shrink-rings apart, cam-rings, the cam-rings having means for actuating said shrink-rings towards each other, means for imparting rotary movement to said cam-rings, and means for admitting heat to said shrink-rings to cause expansion thereof for permitting movement of said member relative to the shrink-rings.

21. In a valve, the combination of a cylindrical casing, the casing having a chamber, a pair of shrink-rings loosely mounted in said chamber, a butterfly rotatably supported in the casing, said shrink-rings being adapted to normally engage said member when closed, means for manually moving said shrink-rings towards each other, means for expanding said shrink-rings to increase their diameter to permit operation of said member relative to the shrink-rings, and diaphragms extending transversely from said shrink-rings to said casing for preventing leakage through said chamber when said butterfly is closed.

22. In a valve, the combination of a cylindrical casing, the casing having a chamber, a pair of shrink-rings loosely mounted in the chamber, a butterfly, the butterfly having trunnions, the trunnions being rotatably supported in the casing, said shrink-rings being adapted to engage said butterfly when closed, means for expanding said shrink-rings to permit operation of said butterfly relative thereto, said butterfly being hollow and open to said shrink-rings, a flexible band enclosing said open portion of the butterfly, said trunnions having openings leading into the hollow portion of the butterfly, and means for admitting pressure through said openings of the trunnion to within the butterfly for acting upon said band for increasing the sealing action.

23. In a valve, the combination of a cylindrical casing, the casing having a chamber, a seat loosely mounted in the chamber, a butterfly, the butterfly having trunnions, the trunnions being rotatably supported in the casing, said seat being adapted to engage said butterfly when closed, means for expanding said seat to permit operation of said butterfly relative thereto, said butterfly being hollow and open to said seat, a flexible band, the flexible band enclosing said open portion of said butterfly, said flexible band being fixed to said butterfly, said trunnions having openings leading into the hollow portion of said butterfly, and means for admitting pressure through said openings of the trunnions to within the butterfly for forcing said band against said seat.

24. In a valve, the combination of a cylindrical casing, the casing having a chamber, the casing having an opening leading into said chamber, a pair of shrink-rings loosely mounted in said opening and entering said chamber, the shrink-rings being adapted to move radially and longitudinally relative to the casing, means for covering the spaces between said shrink-rings and said opening of the casing to permit said longitudinal of said shrink-rings, a butterfly, the butterfly being rotatably supported in the casing, said shrink-rings being adapted to engage said butterfly when closed, and means for expanding said shrink-rings to permit operation of said butterfly relative thereto.

JOSEPH A. GABRIEL.